United States Patent [19]

Drapac

[11] 4,378,551
[45] Mar. 29, 1983

[54] RADIO SIGNAL RECEIVING APPARATUS WITH A SECURITY CIRCUITRY

[75] Inventor: George Drapac, Tamarac, Fla.

[73] Assignee: Motorola, Inc., Schaumburg, Ill.

[21] Appl. No.: 213,523

[22] Filed: Dec. 5, 1980

[51] Int. Cl.³ .......................... H04Q 1/30; G08B 5/22
[52] U.S. Cl. ............................ 340/311.1; 340/825.44;
340/825.32; 340/539; 455/26
[58] Field of Search ........... 340/311.1, 825.44, 825.36,
340/825.45, 825.46, 825.72, 539, 825.32, 506,
534, 568; 455/226–228, 26, 31

[56] References Cited

U.S. PATENT DOCUMENTS

| | | | |
|---|---|---|---|
| 3,228,020 | 1/1966 | Gassenheimer et al. | 340/286 R |
| 3,261,107 | 7/1966 | Ponczek et al. | 34/99 |
| 3,760,134 | 9/1973 | McCray | 200/52 R |
| 3,768,090 | 10/1973 | Williams | 340/311.1 |
| 3,769,593 | 10/1973 | Williams | 340/311.1 |
| 4,149,158 | 4/1979 | Iwaoka et al. | 340/568 |

Primary Examiner—John W. Caldwell, Sr.
Assistant Examiner—Donnie L. Crosland
Attorney, Agent, or Firm—John H. Moore; Edward M. Roney; James W. Gillman

[57] ABSTRACT

A radio signal receiving apparatus such as a pager with a security circuitry includes operator-controlled switches for providing a plurality of different command signals which are used to actuate the receiving apparatus in a different mode of operation, an interface circuitry with an optional feature circuitry coupled to the receiving circuitry of the apparatus for providing various optional functions such as automatic reset, single/dual function or battery saving functions to the receiving apparatus, and a security circuitry for preventing the receiving apparatus from receiving the incoming signal once tampering of the optional feature security is detected.

6 Claims, 2 Drawing Figures

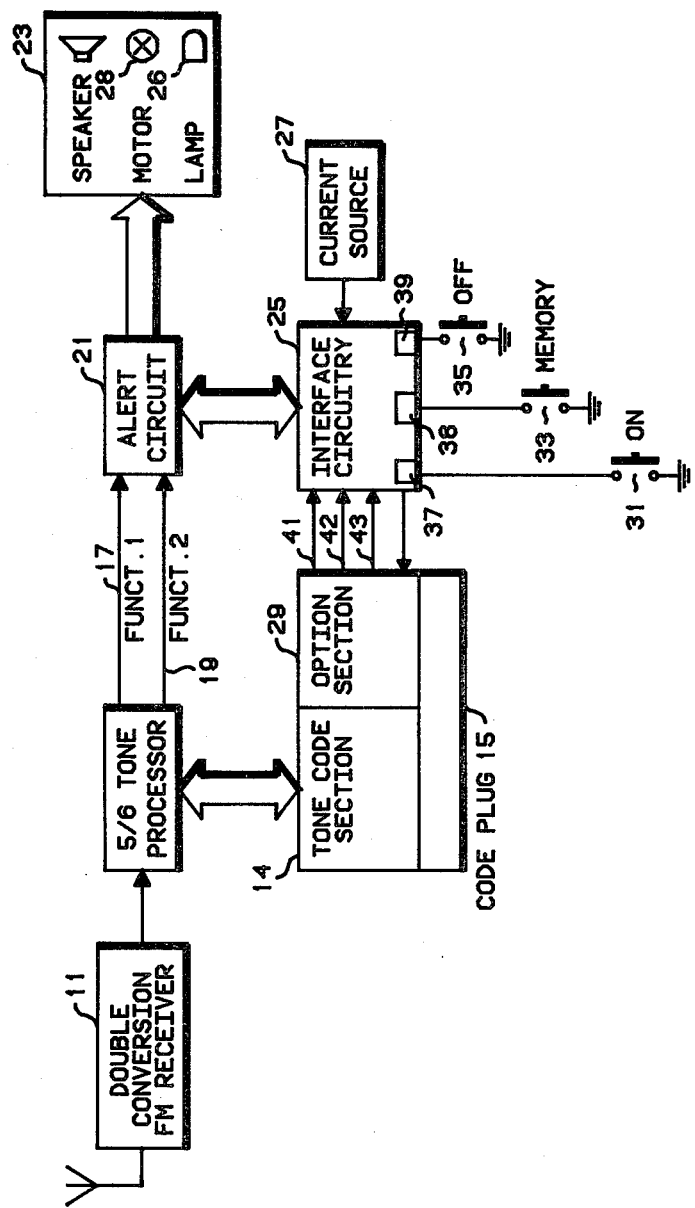

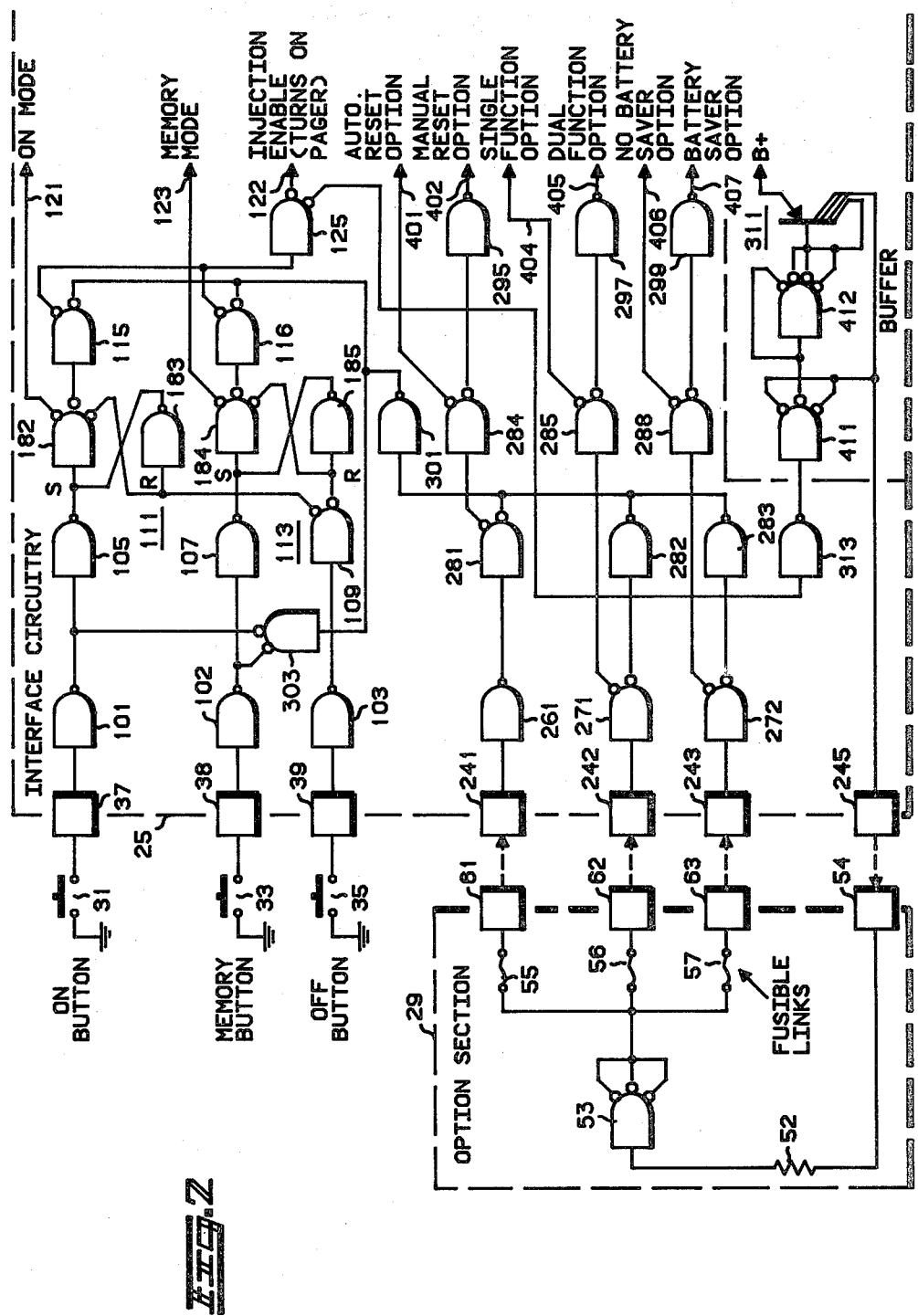

RADIO SIGNAL RECEIVING APPARATUS WITH A SECURITY CIRCUITRY

FIELD OF INVENTION

This invention relates to an improved radio signal receiving apparatus and, more particularly, to a security feature in an RF radio pager provided with various optional features.

BACKGROUND OF THE INVENTION

In recent years, RF radio signal receiving apparatus, especially RF pagers, have been widely accepted by industrial, commercial and private users because of the significant flexibility and convenience the RF pagers provide to the users in providing instant wireless communications. The RF communications link provided by the pagers eliminates the need for wired line telecommunications required in conventional telephone systems and permits the users to have the portable pagers that they can carry with them within the transmission range of the transmitting stations conveniently so that they can be reached at any instance. Using integrated circuitry and digital logic, it has been possible to provide more and more of optional features to the pagers. In spite of the additional features added to the pagers, it has been possible to reduce the size of the pagers even smaller, even to a size not much bigger than an ordinary fountainpen people carry with them.

Additional optional features that are provided in the more enhanced pagers include such features as a dual call option, an automatic reset option and a battery saver option.

A conventional minimum feature pager is of a design that typically detects incoming signal of a particular signal form, for example, five-tone codes, and that includes a switch which is used manually to turn on and off the pagers. Often, the conventional pager does not include a battery-saving feature; thus, they drain a substantial amount of battery energy and render the life of the pager short, or require replacement of the drained battery with a new battery, or recharging the drained battery quite frequently.

More recently-developed pagers are now provided with a battery saving feature which is designed to strobe portions of the receiving circuitry periodically to extend battery life. They are also provided with dual option circuitry permits it to respond to two different signals. This makes the pager adaptable to operate with the five-tone or six-tone signals utilized extensively in the paging systems in the marketplace. They are further provided with an automatic reset option feature that permits the pager to alert and reset the alert after a preset period and thereby quiet the pager after the preset period. This is in contrast with the conventional pager where the pager will continue to alert or beep until the operator resets the pager, thereby annoying bystanders.

For reasons of economy, it has been found to be advantageous to incorporate most or all of the optional features into the integrated circuits used in the pagers and to use elements external to the IC to select or disable selected optional features. To provide this selective enable and disable function, a circuitry, referred to as a code plug, pluggable to the pager circuitry and becomes part of the pager, has been developed. The code plug is designed to include circuitry which includes a programmable options section that may be programmed to suit the need of particular customers on optional features. Naturally, the more options programmed into the code plug, the more options are provided to the user when the code plug is plugged into the pager for use. Of course, it is desirable to relate the selling price of the pager to the number and type of options provided.

A consequence of this approach, however, is that it creates the temptation for users to try to devise ways of using the optional feature circuitry with code plugs of their own design or some suitable bypass scheme without having to pay for the additional charges for the receiving apparatus designed to cover expenses and costs incurred to the original manufacturer.

SUMMARY OF THE INVENTION

It is an object of the present invention to provide general improvements to radio signal receiving apparatus and, more particularly, to pagers. It is yet another object of the present invention to provide security features in a radio signal receiving apparatus, such as in pagers with optional features to prevent unauthorized tampering with the optional features.

It is a further object of the present invention to prevent tampering of the code plug option lines and preventing the pagers from turning on when the option lines have been tampered with.

The foregoing and other objects of the present invention are attained by a radio signal receiving apparatus, such as a pager that includes a signal receiving circuitry for receiving an incoming signal, a plurality of operator-controlled switches for providing operator-initiated different command signals, an interface circuitry with optional feature circuitry coupled to the receiving circuitry and the switches for applying the operator-controlled command signals to enable the signal receiving circuitry to receive the incoming signal upon detection thereof, said optional feature circuitry providing a plurality of predetermined optional function signals, and a security circuitry coupled to the optional feature circuitry for detecting unauthorized tampering of the optional feature circuitry and preventing the receiving apparatus from receiving the incoming signal once the unauthorized tampering is detected.

It is a feature of the present invention to provide a code plug with circuitry with an input to receive ON/OFF signal of the radio signal receiving apparatus, a plurality of output terminals and fusable links interposed between the input and the output terminals for providing output signals indicative of the presence of various options to provide selected optional functions to the radio signal receiving apparatus.

The foregoing and other objects and features of the present invention will become clearer from the detailed description of an illustrative embodiment of the present invention in conjunction with the accompanying drawings.

BRIEF DESCRIPTION OF THE DRAWINGS

FIG. 1 shows an illustrative functional block diagram of a radio signal receiving apparatus such as a pager with optional features in accordance with the present invention.

FIG. 2 shows a detailed schematic logic circuitry adapted to permit detection of unauthorized tampering with the optional feature circuitry.

DETAILED DESCRIPTION OF A PREFERRED EMBODIMENT

As shown generally in the form of a functional block diagram in FIG. 1, a radio signal receiving apparatus, such as a pager of a modern design, includes a double conversion FM receiver 11 which recovers signals and applies the recovered signal to a five/six-tone processor 13. The five/six-tone processors are adapted to enable the receiver to receive either five-tone signal or six-tone signal, whichever is in use. The five-tone or six-tone signals are in tone sequence as generally known. The reception and detection of the five or six-tone is made with tone code section 14 of a code plug 15 with appropriate tones programmed in the tone code section in a conventional manner. The detection results in one of the two unique pager operation alert signals. The decoded and processed five-tone sequence signal referred to as Function 1 Page for convenience is provided by the tone processor to the alerting circuitry 21 via a path 17. Decoding of an additional sixth tone is obtained with reference to the tones programmed in the tone code section 14. The decoded and processed six-tone signal sequence signal, for convenience, referred to as Function 2 Page, is applied via a path 19 to the alerting circuitry 21.

Here obviously, five-tone or six-tone signals are merely recited as examples of the incoming signals of different characteristics, but they need not necessarily be limited to five or six-tone signals. It could very well be the signals of other forms that may be in use. The pager is generally provided with an alert circuitry 21 of a conventional design which is provided to receive the output of the tone processor 13 and generate an output signal that enables a transducer 23. The transducer 23 may be of a conventional design such as a speaker or a lamp that is visible, or a motor that provides vibratory motion to be sensed tactually by the user.

The pager is provided with an interface circuitry 25 which controls the mode of operation of the pager. As illustrated, the switch interface is coupled to a current source 27 and a code plug 15 which is provided with an option section 29 and the operator-controlled switches 31, 33 and 35.

The interface circuitry 25 is of a design that supplies current from the current source 27 therethrough to the code plug, in particular the tone-code section of the code plug, so that the pager is put into a ready state to detect incoming signal. The interface circuitry is also of a design that responds to the operation of the operator-controlled switches and sets the pager to operate in various modes of operation. Should the user attempt to modify the code plug option lines 41, 42 and 43 that link the option section to the interface circuitry, the interface circuitry detects this and prevents it from providing its normal function, that is, enabling the pager to turn on to receive the incoming signal.

Stated generally, the code plug 15 and the interface circuitry 25 operates as follows: When the ON or MEMORY switch is depressed, the pager is turned on. The interface circuitry senses a momentary logic "0" level at the ON or MEMORY pads 37 and 38. This, in turn, enables the interface circuitry to apply the current from the current source 27 to the double conversion receiver 11, the tone processor 13, the alert circuitry 21 and the transducer 23, and thereby makes the pager to be ready to receive the incoming signal. The opposite occurs when the OFF switch 35 is depressed; the momentary logic "0" level is applied to the interface circuitry at its input pad 39 and removes current supply from the receiver 11, tone processor 13 and alert circuitry 21. The interface circuitry 25, however, remains under power with the current from the current source 27 to be in a ready state in a conventional manner. The integrated circuits used in the pager of the present invention is in $I^2L$ logic form. As in all $I^2L$ gates, in order to keep the interface circuitry under power, the current must be injected at all times to the interface circuitry.

Once powered up, the pager illustrated in FIG. 1 will operate in the various modes in which it is designed to function. By way of illustration as shown in FIG. 1, the pager will operate in either ON or MEMORY modes described as follows:

ON Mode Operation

When a Function 1 or Function 2 Page, that is, when a five-tone or a six-tone signal is detected, the operator is alerted immediately by one of the two unique audio alert signals for the five or six-tone signals depending upon the particular tone signal detected.

MEMORY Mode Operation

With this mode, the pager detection does not result in an immediate audio alert, but depending upon pager type, the detection enables different types of transducers such as a vibrator 41 for providing a vibratory signal or a lamp 43 which provides visual indication or a no-alert signal is provided until the pager is interrogated, that is, until the ON switch 31 or the MEMORY switch 33 is depressed.

The pager optional features are selected by providing option logic circuitry in the code plug and the interface circuitry. As illustrated in FIG. 1, there are provided three option links 41, 42 and 43 for providing outputs from the code plug which are to be used by the logic interface circuitry in providing optional functions to the pager.

Basic features of a pager are that they are generally designed to detect an incoming code signal and alert the operator until the operator resets the pager by depression of the ON or MEMORY switches or buttons.

With a programmable code plug and option logic circuitry provided in the code plug and a circuitry according to the present invention, the following optional functions are provided:

1. Dual Option

The non-optioned basic pager will allow detection of only one form of incoming signal; for example, five-tone or Function 1 Page signal. With the dual option, the pager is allowed to function so that it will receive different incoming signals, for example, five-tone or six-tone, and provide Function 1 or Function 2 paging signals and alert the operator.

2. Automatic Reset Option

With a non-optioned pager, once alerting begins it will continue to alert the operator until he resets the pager by depression of the ON or MEMORY button; but with automatic reset option circuitry provided in the pager, the pager automatically resets, that is, quiets the pager alert signal after a period of predetermined time interval.

3. Battery Saver Option

With a conventional non-optioned basic pager, once turned on, all of the pager circuits are actuated and consume power. With a battery-saver option feature, the interface circuitry applies power to only portions of the circuits periodically scanned to strobe the presence of incoming signal to extend the battery life.

In accordance with the present invention, security circuitry is provided in such a way that when the code plug option lines or the interface circuitry input terminals to which the output of the code plug may be applied are tampered with, this will be detected, and upon detection of the tampering, the security circuitry generates an output signal which prevents the operator-controlled command signal from actuating the pager, thereby preventing the pager from turning on and receiving the incoming signal.

Referring to FIG. 2, there is shown a detailed functional schematic of an illustrative example of the interface circuitry 25 in detail and an illustrative example of the option section 29 of the code plug 15. The FIG. 2 represents an illustrative example of the logic circuitry in a conventional schematic I²L form operatively connected as illustrated to provide the various desired optional functions according to the present invention.

With an external code plug 15 attached and the pager in the "OFF" mode, all of the operator-controlled switches; namely, ON, MEMORY and OFF switches, are open, as illustrated. The option section of the code plug is provided with a logic circuitry in the form of a NAND gate 53 to which an input signal may be applied from an input terminal 54 via a resistor 52. The circuitry includes fuses 55, 56 and 57 which links the output of the NAND gate 53 to the output terminal pads 61, 62 and 63. Input to the NAND gate comes from an output of the interface circuitry that signifies whether or not the pager is turned on or turned off. The input pad 54 and the output pads 61, 62 and 63 are structured to be mated with corresponding terminal pads 241-245 in the interface circuitry, as illustrated when the code plug is plugged in.

The interface circuitry itself includes the input pads 37, 38 and 39 for receiving ON, MEMORY or OFF signal from the operator-controlled switches 31, 33 and 35. The ON, MEMORY and OFF pads are linked to a plurality of NAND gates 101, 102, 103, 105, 107, 109, conventional latch circuits 111 and 113, and NAND gates 115 and 116, as schematically illustrated and connected in a conventional manner.

The latch 111 and latch 113 provide latching operation in response to the ON mode signal and MEMORY mode signal when the ON or MEMORY buttons are pressed, respectively. The output of the latch 111 provides an output to signify an ON mode via a path 121, and the output of the latch 113 provides an output for signifying MEMORY mode via a path 123. The output of the NAND gates 115 and 116 are used to provide an output via NAND gate 125 which energizes or actuates the pager into an energized state so that it is ready to receive an incoming signal.

The option feature circuitry designed to enable the pager to operate in various different functional modes includes the option section 29 in the code plug 15 and a a logic circuitry comprised of operatively connected NAND gates 261, 271, 272, 281, 282 and 283, 284, 286, 288, 295, 297 and 299, as illustrated in FIG. 2. The outputs of the logic gates 281, 282, 283 are coupled to an input of a NAND gate 301. As will be seen in detail later gates 281, 282, 283 and 301 form a security circuitry that detects tampering of the code plug and the option feature circuitry. The output of the NAND gate 301, as well as the output of the NAND gates 115 and 116, is coupled to the input of NAND gate 303, and the output of the NAND gate 303 is coupled to the input of the NAND gate 105 and 107. The output of the NAND gate 125 is also applied to a buffer circuitry 311 via a NAND gate 313. The buffer is of a conventional design which is coupled to a battery supply B+, as schematically illustrated.

The inputs to the optional feature circuitry may be applied via the input pads 241, 242, 243 of the interface circuitry, which serves as the input for the automatic/manual option, the dual option and the battery-saver option for pager. The interface circuitry also includes output terminal pad 245 which serves as the output pad for applying the pager ON or OFF signal to the security circuitry in the option section of the code plug 15 via the input pad 54 of the code plug. The terminals of the code plug and interface circuitry are adapted so that when the code plug is plugged in, they mate and establish electrical contact.

Various outputs of the interface circuitry are applied via the corresponding outputs to the various parts of the pagers in a conventional manner.

Thus, referring to FIG. 2, the output of the first latch 111 is applied via the output lead 121 to provide an ON mode signal to the pager. The latch 113 output is applied via lead 123 to provide a MEMORY mode signal to the pager. The NAND gate 125 provides one output via a lead 122 to turn on the pager. The output of NAND gate 125 is also applied to the buffer via NAND gate 313 to provide a signal to indicate to code plug that the pager is on or off.

Various logic circuitries comprised of the logic gates 261 through 299 are provided with output leads 401, 402, 404, 405, 406 and 407 for providing output signals indicative of the presence of optional function signals. Thus, the output leads 401 and 402, respectively, provide automatic reset and manual reset option signals, respectively. The output leads 404 and 405 provide single or dual function option signals, respectively, and the output leads 407 and 406 provide the signal indicative of the presence or absence of battery-saver option, respectively. These signals are used to energize various features (not shown) in the pager that the optional functions desire.

In operation, referring to FIG. 2, with the code plug plugged in and the pager in the "OFF" mode, the code plug gate 53 output is forced to Logical "1". This, in turn, forces the inputs of the gates 261, 271 and 272 to logic "1". The logic "1" level at the inputs of the gates 261, 271 and 272 force the inputs of the gates 281, 282 and 283 to a logical "0". This causes the output of the gate 301 to go to a logical "0". In response, NAND gate 303 provides logical "1" output. With the output of gate 303 at "1", logical "0" generated by the depression of the ON switch 31 or MEMORY switch 33 is routed through gates 101 or 102, respectively, and allows the On mode or the MEMORY mode latches 111 and 113 made of gates 182 and 183 and 184 and 185 to a set state, respectively.

Should any of the option inputs at the input of the gates 261, 271 and 272 be "0" prior to power turn-on, the above sequence will be inhibited as the output of the gate 303 is being held to "0" and this will prevent power turn-on. This can happen if user tries to ground input pads 241, 242 or 243 or any combination of them, or remove the code plug. In this manner, gates 281, 282, 283 and 301 and associated logic detects tampering of optional feature circuitry and prevent the receiver from securing incoming signal.

The setting of the ON mode or MEMORY mode latches power up the pager, as well as determines the mode of operation. This is so in that with either the ON or MEMORY button pressed momentarily in the initial state, the ON mode latch 111 or the MEMORY mode latch 113 will be latched and provides a Logical "1" output and applies it to the gate 115 or 116, respectively. This will cause the gate 125, in turn, to provide an output logical "1". This will then turn the pager on via the output lead 122 and also turn the buffer on to apply a Logical "1" to the code plug via the pads 245 and 54 and the resistor 52 and the NAND gate 53.

Once the pager is functioning in either the On mode or MEMORY mode, the output of gate 115 or 116 will be logical "0". This forces the output of gate 303 to logical "1" and allows ON or MEMORY switch depressions to be processed regardless of the levels of the pager option lines, that is, option signal levels applied to the input of the logical gate 261 to 271 or 272 via the option input pads 341, 342 or 343, respectively.

This control of the pager operation independent of the optional feature circuitry once the pager is turned on by the feedback from the gate 115 or 116 to the gate 303 is necessary while the pager is ON or MEMORY mode irrespective of the level of the output of each option output at gates 281, 282 and 283.

When the pager is off, the code plug option selection gate 53, holds all the option lines to logical "1", that is to say, the output pads 61, 62 and 63 of the code plug is held to logical "1". Thus, when the OFF button is pressed, the pager is turned off; this means that the inputs to logical gates 261, 271, 272 are in Logical "1". Selection of various combinations of options for a particular customer is made by simply providing a code plug which has selected combination of connections made of fusable links 55, 56 and 57. Code plug option features can be programmed by blowing the fusable links of the three fuses 55, 56 and 57. Should there be a need for more options, additional fusable links and associated optional feature logic circuitry may be provided.

Depressing the OFF switch button resets the ON mode and MEMORY mode latches, and this forces the outputs of the gate 125 to logical "0". This, in turn, turns off all current sources, except for the interface circuitry 25 itself. Once the pager is turned off, the outputs of logical gates 115 and 116 go to logical "1", and this allows the output level of gate 301 to control the input level of the gate 303. In this manner again, security feature provided by the option feature logic circuitry output applied to gate 301 is allowed to take effect.

It is clear from the foregoing that should anyone attempt to tamper with the fusable option links 55, 56 or 57 or the option terminal pads 241, 242 or 243 by grounding them, the option logic circuitry made of the various gates; 261, 271, 272, 281, 282, 283, the gates 301 and 303 prevent the ON switch button or the MEMORY switch button from applying its signal to the latches 111 and 113 and thereby prevent operation of the pager.

Hereinabove, an illustrative embodiment of the present invention in the form of an improved pager has been described which includes a code plug with option selection and an interface circuitry with option logic circuitry adopted to prevent tampering of the code plug or the interface circuitry to upgrade pager options. Various modifications and additions may be made to the present invention without departing from the spirit and scope thereof.

What is claimed is:

1. In a radio signal receiver having signal receiving circuitry for receiving an incoming signal, one or more built-in option circuits for enhancing receiver operation, and a plurality of operator-controlled switches for providing different operator-initiated command signals, the improvement comprising:
option control circuitry coupled to the receiving circuitry for providing a plurality of predetermined control signals for enabling selected option circuits;
an interface circuit coupled to the receiving circuitry and responsive to the operator-controlled switches for enabling the signal receiving circuitry; and
security circuitry coupled to the option control circuitry for detecting unauthorized tampering of the option control circuitry and for inhibiting the interface circuit from enabling the signal receiving circuitry when such unauthorized tampering is detected.

2. The improvement as set forth in claim 1 wherein said option control circuitry is embodied in a code plug having outputs for coupling the control signals to the receiving circuits via the security circuitry, and wherein the security circuitry is responsive to the code plug being grounded for inhibiting the interface circuit from enabling the signal receiving circuitry.

3. The improvement as set forth in claim 2 wherein the option control circuitry includes a plurality of fuse links through which the control signals are coupled to the outputs of the code plug, whereby selected option circuits may be deselected by blowing selected fuses.

4. The improvement as set forth in claim 3 wherein the outputs from the code plug are coupled to the security circuitry via connecting terminals, and wherein the security circuitry includes:
logic circuitry for sensing unauthorized connection to ground of said connecting terminals to detect unauthorized bypassing of the code plug; and
a gating circuit coupled to the output of said logic circuitry for generating a logic signal to lock out the receiving circuitry so that the receiving circuitry is prevented from processing incoming signals.

5. The improvement as set forth in claim 4 further including circuitry coupled to the operator-controlled switches for placing the receiver in ON, MEMORY and OFF modes of operation, wherein the ON mode renders the receiver operative to process incoming signals, wherein the MEMORY mode renders the receiver able to activate a visual or vibratory transducer, and further including latch circuits for latching the receiver in the ON or MEMORY mode, and a feedback path around the latch circuits to lock the receiver in the ON or MEMORY mode irrespective of the output from said security circuitry.

6. The improvement as set forth in claim 1 wherein the command signals provided by the operator-controlled switches include a turn-on command signal, wherein the interface circuitry includes means for sensing the turn-on command signal to turn the receiving circuitry on and to provide an input signal to the option control circuitry, the latter circuitry being responsive to said input signal for outputting the control signals to enable selected option circuits.

* * * * *